United States Patent [19]
Brown

[11] 4,305,226
[45] Dec. 15, 1981

[54] LIFE LINE WICK VEINS

[75] Inventor: Lawrence F. Brown, 467 Saddlewood Ave., Dayton, Ohio 45419

[73] Assignee: Lawrence F. Brown, Dayton, Ohio

[21] Appl. No.: 562,213

[22] Filed: Mar. 26, 1975

[51] Int. Cl.³ ............................................. A01G 25/00
[52] U.S. Cl. ......................................................... 47/81
[58] Field of Search .................... 47/1, 38, 38.1, 9, 58, 47/81, 79, 78

[56] References Cited

U.S. PATENT DOCUMENTS

| | | | |
|---|---|---|---|
| 216,808 | 6/1879 | Schrader | 47/38 |
| 1,627,890 | 5/1927 | Ellis | 47/38 |
| 2,228,892 | 1/1941 | Zimmerman | 47/38.1 |
| 2,346,029 | 4/1944 | Jennings | 47/38.1 |
| 2,491,124 | 12/1949 | Martin | 47/38 |
| 2,659,180 | 11/1953 | Acton | 47/38.1 |
| 2,814,161 | 11/1957 | Hawkins | 47/38 |
| 3,205,619 | 9/1965 | Henry | 47/9 |
| 3,603,034 | 9/1971 | Maxwell-Stewart | 47/38 |
| 3,683,548 | 8/1972 | Hagerty | 47/38.1 |
| 3,710,510 | 1/1973 | Tully et al. | 47/58 |

*Primary Examiner*—James R. Feyrer

[57] ABSTRACT

A plant growth and care system, wick veins, for all containers, utilizing a multi-treated combination of flat sheets of layered wick materials combined and formulated according to the best knowledge of the horticulture science per species of plant, said treated wicks, coated and veined with preferred plant aids are placed flat out across the bottom of container covering drains, preventing soil leakage, two or more strips for larger containers according to size. Wick veins provide plant food treatment and moisture storage, also dissolution and distribution throughout. They also provide oxidation aeration to condition plant aids and foods. They also furnish adequate drainage to all types of sealed surface containers, glazed, plastic, glass, etc., now known as beautiful but deadly. The above treated wicks are all motivated by the enclosure of plastic tubes and wick cords and strips, providing porous passages between the several flat formula coated wick layers, the plastic tube extends on out above soil to top of container and is pierced at chosen areas in bottom of container to provide complete service throughout. Action is motivated by air pressure through tubes forcing moisture and all types of care and treatment recommended, through the vented tubes, these are spread and resupplied by the treated layers of wick materials covering the bottom and up the sides of container. Surely and timely by air pressure force moving all types of care to all root areas conditioner and mixing all stored foods therein.

1 Claim, 8 Drawing Figures

LIFE LINE WICK VEINS

BACKGROUND OF THE INVENTION

An interveinous type of wick vein service core, from my study and patent office search, etc., I believe to be the first professionally directed and prescribed, exactly timed, direct action force controlled, six method treatment system of plant care. The best action care anyone can get for planted beds or each type of container planted with any number of plants, plus attached color key identified wick veins and prescript packet of starter aids.

Life Line wick veins have a several avenue service tube cord enclosed in pressed layers of wick materials or a slip-on layer dome, each layer treated and combined with professionally prescribed plant aids to produce to grow the finest species of any chosen kind or species of plant in any variation of container, with or without drain. Prescripts are identified by color marks on wicks and markings on retail charts. No sweat, no lost time, no study, no search, no dirt, no storage, no mistakes, no worry, no failures, no excess damage, no dull dormant plants.

Wick veins are placed on bottom of container, covered with soil. The ends of tube and wick reaches up ends of container or planting bed to above surface of soil. This provides plant aid placement in wick and container, surface to soil aeration by wick increased by air pressure from tube, a great aid for porous type containers, a must for non porous plastic, glazed, etc., containers.

Excess settled water can be blown out opposite end of tube by pump giving test specimins. By closing end of tube, excess water is evaporated from bottom up through vents and driven out of soil, this also helps moisten leaves. Roots must be watered but not drowned to root rot, they must also be periodically aerated and fertilized with no excess damage.

This is all periodically direct action timed and we know just how long and when they drink, eat, or breath. Six system treatments are soil sweeteners or acidity, periodic aeration, special plant foods, temperature control, soil treatments and conditioners all professionally prescribed, and entered through tubes at pump, timely, accurately, directly force controlled, through tube, through vents out through prescript wick, up through soil to roots, plant-"prescript care". Excess moisture is pushed out through surface of soil, bringing moisture to foliage of plants.

An interveinous, direct timely action, force controlled care for all plant beds and for all container planted plants. In all of my searches and study, I have found no real likeness that deserves comparison or indicates conflict.

Figure 1:
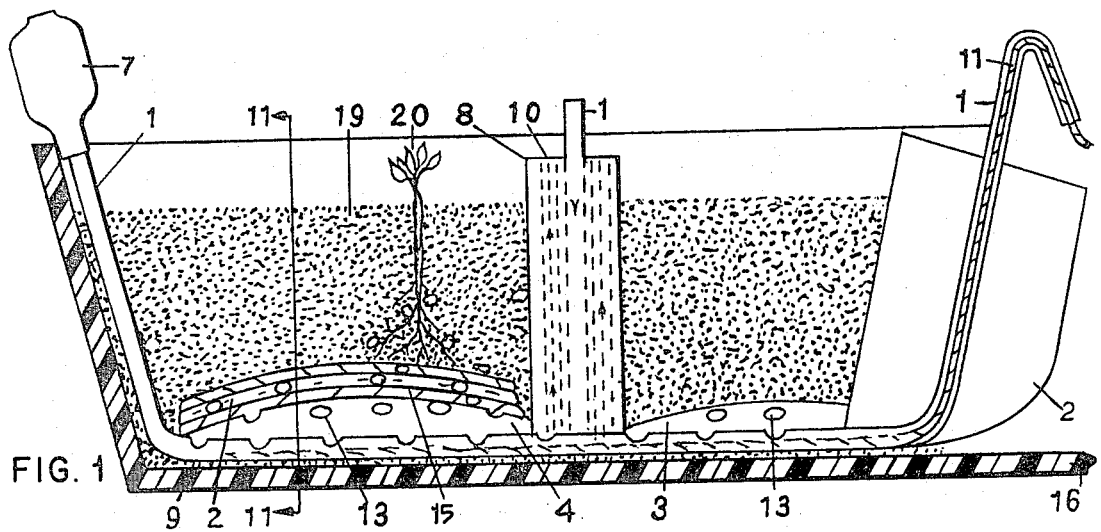
FIG. 1 is a side, cross sectional view of the invention installed in a plant container.

FIG. 1 no. 1 tube core pump pressures excess water out for drainage and test samples.

Figures 4, 5, 6:
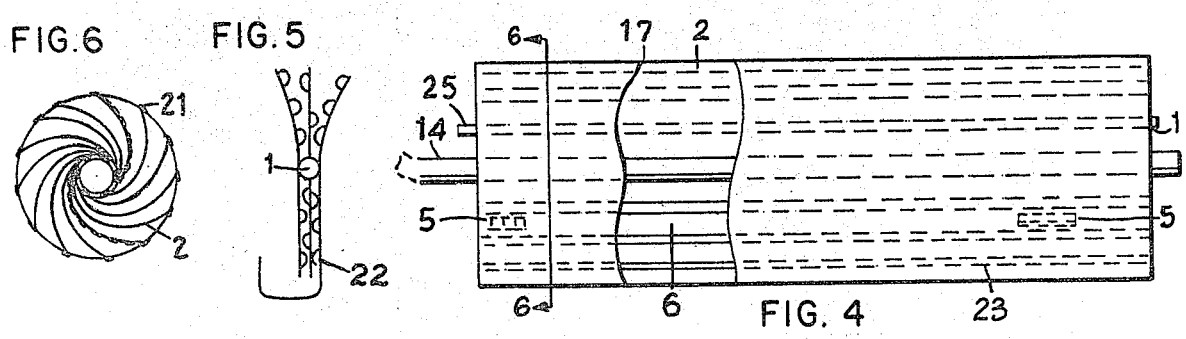
FIG. 4 is a plan view showing a further embodiment of the invention absent the domes.
FIG. 5 is a cross sectional view taken on line 6—6 of FIG. 4.
FIG. 6-8 show a further, rolled embodiment of the invention adapted for insertion into the soil.

FIG. 1 no. 1 is a tube core with inserted fiber wick evaporation aid, FIG. 1 no. 11, or an all fiber wick core for special cases as shown in FIG. 4 no. 14. Core 1 extends through container showing vent opening 13, snap on or threaded by eyelet layered cap bubble dome 3, and 15, each with aeration vents 13, following 1, on through FIG. 1, sec. 16, showing a 90% turned sectional view of pressed layered wick 2 is a covering for enclosed tube vein 1, containing fiber wick 11, an inserted evaporation aid through which evaporation is greatly expanded by forcing air pressure through tube 1, by pump 7. Holes in vents 13 are for drainage by evaporation or forced aeration by vented layered dome 15 through soil 19 aerating feeding roots of plant 20. Evaporation is also greatly increased through 2, that serves as a soil to container vent at side or ends. FIG. 1 no. 7 is one form of unit for air pressure by closing other end of tube 1. Unit delivers forced, timely, periodic aeration, evaporation, drainage, temperature control, watering, and prescript care feeding, no excess damage, a six service prescript care service.

Figure 2:
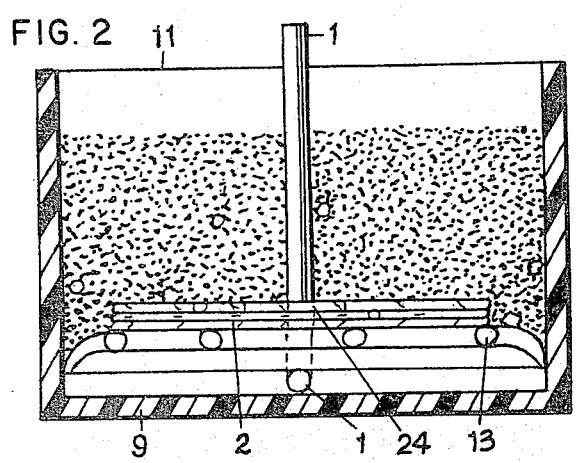
FIG. 2 is a sectional view taken along line 11—11 of FIG. 1.

FIG. 2 shows FIG. 1, sec. 11—11, three quarter view of interior end of container, showing treated wick 2. Covering core 1, no. 2 is flatened out over bottom and end of container, affording a great degree of drainage, aeration and fertilization surface, and all professionally prescribed treatments for any specie of plant, any container made of any type of material, porous or non-porous, drain or without drain. FIG. 2 no. 5 is a prescription identification system, a color mark on product, wick veins, to be identified with color key on retail chart. FIG. 2 no. 24 is a removable planting prescript soil aid packet to correspond to prescription for species of plant in treated wick vein 2. The proper starting area aid for a chosen species of plant. The best aid and direction anyone can give or get.

Additional plant aids are dropped into tube 1 at the pump end and by closing opposite end of tube 1, direct force controlled by air pressure is established. All plant aids are delivered directly, timely, and certainly through tube 1, through vents 13, up through wick layers 2, through energized dome layers 15, through soil 19, to plant roots 20. Excess water is also forced out of soil to moisten foliage.

Figure 3:
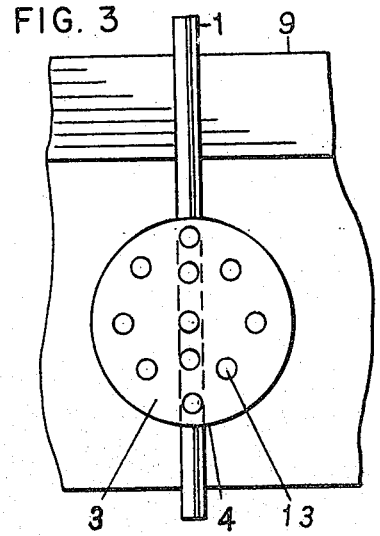
FIG. 3 is a partial plan view of the invention in FIG. 1.

FIG. 3 shows tube vein core 1, with vented mat 3 or snap on, loop on vented cap dome 3 with vents 13, plant aids and filter layers FIG. 1 no. 15 with snap on groove 4, and bubble dome 15 shows layers of professionally prescribed plant aids per species of plant, per planting. Color key identified by color mark on dome to be identified by retail chart.

FIG. 4 shows flat section of wick vein covered core 1, auxiliary tube core no. 25, for special aid as temperature control, etc., and fiber wick vein extension 14. FIG. 4 sec. 17 no. 6 shows minor cores and layers of wick material covered with prescribed plant foods, soil conditioners, insecticides, etc., combined to make up the most expertly composed formula for each and all various plants, each a professional prescription, the best anyone can find or do, give or get, plus a director for various size of container, for a given time this service for each one of your plantings. FIG. 4 no. 23, shows section of extended layer of wick or plastic material, that can be applied to any section of wick 2, extending past edge as shown in FIG. 5 no. 22 so that extended layer of wick material or plastic, when rolled into insertion roll as FIG. 6 no. 2, (2×scale), it will seal and hold all wick materials into a rolled wick that may be handily inserted into a pierced hole in soil in a permanently planted plant in any container. These maintain avenues of all aids and services to any types of plants. Plastic is used as indicated in FIG. 4 no 23, also FIG. 5 no. 22, and rolled as in FIG. 6 no. 21 to produce a double or multi-chamber pressure container. When this chambered unit is placed in planted container so that one end is on bottom as in FIG. 1 no. 10 this wick material attracts excess water at the base, and as air pressure is built up at base to tube 1, air flow as per arrow, evaporation is greatly increased, this increased evaporation helps to keep foliage moist and fresh.

FIG. 5 is FIG. 4, sec. 6—6 turned and the wick layers are spread to show coating of prescribed aids as FIG. 4 no. 6 to give prescript core, per species to be planted, there in professionalizing each planted pot. The best anyone can do, any place, at any time. Wick vein package care saves you much study, time, shopping, storage, mistakes, and a mess of care.

FIG. 5 no. 1 is wick vein core either combination plastic or wick core.

FIG. 6 shows layer wick 2 rolled around core 1, (2×scale). This is one form of product for application as FIG. 1 no. 10, watering, evaporation core, or fertilization tube, when inserted in pierced hole in core to bottom of container. This does not damage permanent planting, it saves replanting.

Figures 7, 8:
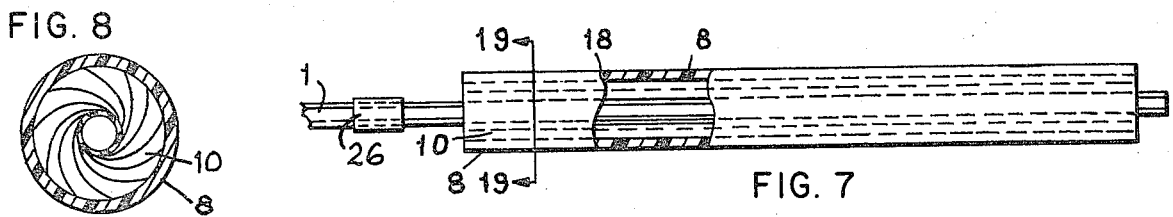

FIG. 7 shows core 1 rolled into layer wick 10 or 2, and inserted into plastic tube 8 that serves as a two way pressure chamber.

FIG. 7 no. 26 is moveable outer tube sleeve to cover or open vent holes in tube, to regulate flow in area.

FIG. 8 shows FIG. 7, sec. 8—8, turned to show tube core 1, with rolled wick filter 10, inserted into pressure chamber 8. Air pressure is added as at FIG. 1 no. 1. Pressure is built up at bottom end of tube in bottom of sectioned container. As air pressure forms, it forces its way through saturated wick filter FIG. 1 no. 10. As shown by arrows, this greatly increases amount of evaporation up through pressure channel 10, to bring and give much needed moisture to foliage of plant.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A plant care package for rooted plants in plant beds and containers wherein the package includes a wicking device comprising a plurality of layers of wick material treated with plant aids chosen in accordance with known requirements of individual plant species, and at least one flexible wick lined tubular member provided with apertures along the axial length thereof; said layers of wick material and said wick lined tubular member adapted to be placed across a bottom surface of a container beneath the soil and plant roots therein, said tubular member being enclosed by said layer of wick material and adapted to extend up at least one side of said container so that at least one open end of the tubular member protrudes above the container soil surface and up over said one side of the container thereby providing drainage and aeration avenues of the soil and further permitting application of air pressure through said tubular member and said apertures to facilitate movement of said plant aids through the soil to the plant roots; said package further comprising a packet of additional plant aids for application to the soil through the open end of said tubular member; said device having an identifying mark thereon correlating to a similar mark on an associated retail chart for facilitating selection of appropriate plant care packages for individual plant species.

* * * * *